(12) United States Patent
Masuda et al.

(10) Patent No.: US 10,884,239 B2
(45) Date of Patent: Jan. 5, 2021

(54) OPTICAL SCANNING DEVICE AND METHOD OF DETECTING ANGLE OF REFLECTION UNIT IN OPTICAL SCANNING DEVICE

(71) Applicant: FUNAI ELECTRIC CO., LTD., Osaka (JP)

(72) Inventors: Yuichiro Masuda, Takatsuki (JP); Takeshi Inoda, Nara (JP); Mika Hamaoka, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 50 days.

(21) Appl. No.: 15/995,140

(22) Filed: Jun. 1, 2018

(65) Prior Publication Data

US 2018/0364475 A1 Dec. 20, 2018

(30) Foreign Application Priority Data

Jun. 19, 2017 (JP) .................................. 2017-119255

(51) Int. Cl.
| | | |
|---|---|---|
| G02B 26/12 | (2006.01) | |
| G02B 26/08 | (2006.01) | |
| G01D 5/347 | (2006.01) | |
| G01S 17/42 | (2006.01) | |
| G01S 7/481 | (2006.01) | |
| B41J 3/00 | (2006.01) | |
| G02B 26/10 | (2006.01) | |
| G06K 15/12 | (2006.01) | |
| H04N 1/23 | (2006.01) | |
| B41J 2/47 | (2006.01) | |

(52) U.S. Cl.
CPC .............. *G02B 26/127* (2013.01); *B41J 2/47* (2013.01); *B41J 3/00* (2013.01); *G01D 5/3473* (2013.01); *G01S 7/4817* (2013.01); *G01S 17/42* (2013.01); *G02B 26/085* (2013.01); *G02B 26/0833* (2013.01); *G02B 26/10* (2013.01); *G02B 26/121* (2013.01); *G06K 15/12* (2013.01); *H04N 1/23* (2013.01)

(58) Field of Classification Search
None
See application file for complete search history.

(56) References Cited

U.S. PATENT DOCUMENTS

| | | | |
|---|---|---|---|
| 7,967,755 B2 | 6/2011 | Hasegawa | |
| 2010/0076316 A1* | 3/2010 | Hasegawa | .............. G01N 29/06 600/459 |

(Continued)

FOREIGN PATENT DOCUMENTS

| | | |
|---|---|---|
| CN | 101112321 | 1/2008 |
| JP | S58155972 | 9/1983 |

*Primary Examiner* — Shawn Decenzo
(74) *Attorney, Agent, or Firm* — JCIPRNET

(57) ABSTRACT

Provided is an optical scanning device. The optical scanning device includes a swingable reflection unit; a blocking unit that is provided in the reflection unit to move in linkage with the reflection unit; and a sensor unit that includes an output unit configured to output a detection target and a detection unit configured to detect the detection target, wherein, when the reflection unit is in a predetermined swing angle range, the blocking unit blocks a path of the detection target between the output unit and the detection unit.

20 Claims, 11 Drawing Sheets

(56) References Cited

U.S. PATENT DOCUMENTS

| | | | |
|---|---|---|---|
| 2011/0101209 A1* | 5/2011 | Benner, Jr. ............... | G01D 5/34 |
| | | | 250/231.16 |
| 2013/0140446 A1* | 6/2013 | Benner, Jr. ............... | G01D 5/34 |
| | | | 250/231.16 |
| 2015/0211840 A1* | 7/2015 | Katsumata ............... | G02B 7/14 |
| | | | 348/340 |
| 2016/0040988 A1* | 2/2016 | Yanobe ................... | G01C 1/02 |
| | | | 250/231.13 |
| 2017/0299412 A1* | 10/2017 | Tseng .................... | G06F 3/0362 |
| 2019/0137304 A1* | 5/2019 | Takai .................. | G01D 5/24461 |
| 2019/0170542 A1* | 6/2019 | Yang ........................ | G01D 5/34 |

\* cited by examiner

OPTICAL SCANNING DEVICE AND METHOD OF DETECTING ANGLE OF REFLECTION UNIT IN OPTICAL SCANNING DEVICE

CROSS-REFERENCE TO RELATED APPLICATION

This application claims the priority of Japan patent application serial no. 2017-119255, filed on Jun. 19, 2017. The entirety of the above-mentioned patent application is hereby incorporated by reference herein and made a part of this specification.

BACKGROUND

Technical Field

The disclosure relates to an optical scanning device (optical scanner) configured to swing a reflection unit configured to reflect light, change a light travelling direction, and scan light, and a method of detecting an angle of a reflection unit in the optical scanning device.

Description of Related Art

An optical scanning device (optical scanner) that swings a reflection unit (such as a mirror) configured to reflect light from a light source and emit the light and thus changes a travelling direction of the light, and scans light is known in the related art. In one example of this type of optical scanning device, light from the reflection unit is emitted to a measurement target object that is positioned in a scanning range, and reflected light and scattered light from the object is received by the reflection unit (such as a mirror). Then, when a time from when light is emitted from the reflection unit until it is received by the reflection unit, or a swing angle of the reflection unit is measured, it is possible to detect a distance to the measurement target based on the reflection unit and a direction in which the measurement target is positioned. As another example of the optical scanning device, a distance measuring device using light detection and ranging (LIDAR) technology is known.

In the optical scanning device, when a position and a distance of an object are measured by scanning light, an angle of the reflection unit is accurately detected in order to determine a direction of a target object, in order to adjust a timing at which a light source is caused to emit light according to an angle of the reflection unit, and in order to adjust a swing period of the reflection unit. In order to detect an angle of the reflection unit, an angle that can be detected is arbitrarily set.

As a conventional method of detecting an angle of a reflection unit in an optical scanning device, there is provided a technology in which a timing at which light emitted from a reflection unit that swings enters a detection unit (such as an image sensor) is measured and thus an angle of the reflection unit is detected.

For example, light may made to be incident on a reflection unit using an auxiliary light source for angle detection, reflected light thereof may be detected by an image sensor, and thus an angle of the reflection unit can be detected (Patent Document 1: Japanese Laid-open No. S58-155972).

However, in this technology, the cost of an optical scanning device is high because it is necessary to design a complex optical path and an auxiliary light source and an image sensor are necessary.

SUMMARY

An embodiment of the invention provides an optical scanning device including: a swingable reflection unit; a blocking unit that is provided in the reflection unit to move in linkage with the reflection unit; and a sensor unit that includes an output unit configured to output a detection target and a detection unit configured to detect the detection target, wherein, when the reflection unit is in a predetermined swing angle range, the blocking unit blocks a path of the detection target between the output unit and the detection unit.

BRIEF DESCRIPTION OF THE DRAWINGS

FIG. 2(A) shows a state of a sensor unit when no blocking unit is positioned between a light emission unit and a light detection unit and FIG. 2(B) shows a state of a sensor unit when a blocking unit is positioned between a light emission unit and a light detection unit.

FIG. 5(A) shows a state before a position of the sensor unit including a light detection unit is changed. FIG. 5(B) shows a state after a position of the sensor unit including a light detection unit is changed.

FIG. 15(A) is a waveform diagram showing a signal (a signal on which a noise component is superimposed) from a sensor unit having no hysteresis and an angle detection signal according to threshold value determination. FIG. 15(B) is a waveform diagram showing a signal (a signal on which a noise component is superimposed) from a sensor unit having hysteresis and an angle detection signal according to threshold value determination.

DESCRIPTION OF THE EMBODIMENTS

Figure 1:
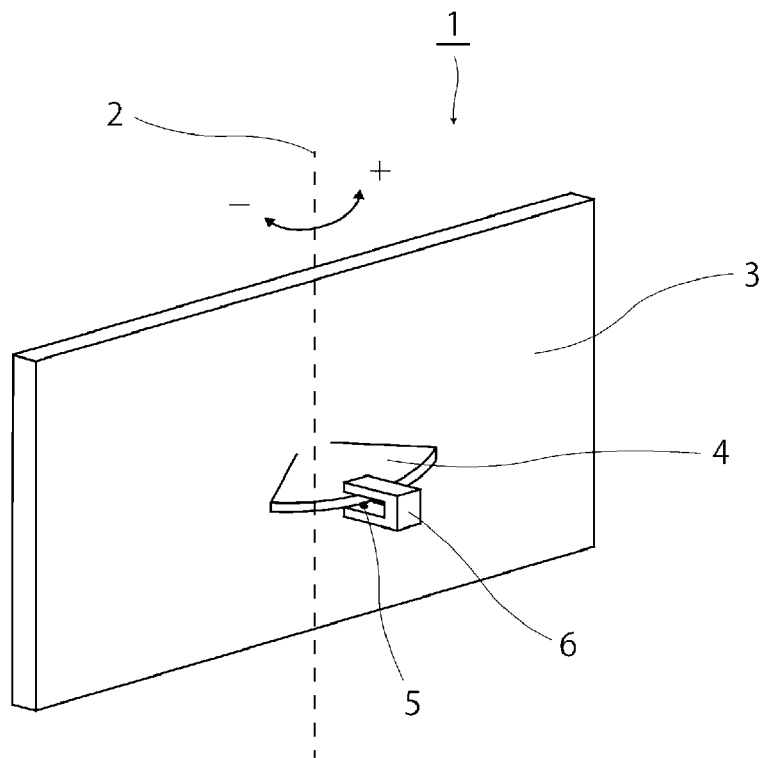
FIG. 1 is a perspective view schematically showing an optical scanning device according to a first embodiment of the invention.

The embodiments of the invention provide an optical scanning device and a method of detecting an angle of a reflection unit in the optical scanning device through which it is possible to accurately detect an angle of the reflection unit with a simple configuration without a complex optical path design.

In the optical scanning device and the angle detection method of one or some exemplary embodiments of the invention, a blocking unit that operates in linkage with the reflection unit and a sensor unit that includes an output unit and a detection unit are included. When the reflection unit reaches a predetermined swing angle, the blocking unit blocks a path of a detection target between the output unit and the detection unit of the sensor unit and it is possible to detect that the reflection unit has reached the predetermined swing angle. Therefore, it is possible to detect a swing angle of the reflection unit with a simple configuration without a complex optical path design.

1. Optical Scanning Device

An optical scanning device of the embodiments of the invention is an optical scanning device including a swingable reflection unit.

In the embodiments of the invention, the "reflection unit" refers to a member that can reflect light. As a polyhedral shape reflection unit, for example, a member that is obtained by providing a metal thin film such as an aluminum thin film and a silver thin film on a substrate, a mirror in which a metal thin film is provided on the back side of a transparent substrate, a metal plate whose surface is mirror-processed, and the like can be used. The reflection unit may have a flat plate shape, a polyhedron shape, or a curved shape.

The reflection unit swings while reflecting light rays from a light source, changes a light travelling direction, and scans light.

For example, the optical scanning device of the embodiments of the invention scans light, detects reflected light and scattered light from an object that is positioned in a light travelling direction, measures a time taken for detection or an incident direction, and thus determines a distance and a shape of a target object and the like. The optical scanning device of the embodiments of the invention can be used for, for example, a device called a light detection and ranging (LIDAR) device and a barcode reader.

In addition, since the optical scanning device of the embodiments of the invention scans light, it can be used for a device configured to form an image, for example, a projector, a display, and a laser printer.

The optical scanning device of the embodiments of the invention includes a blocking unit that operates in linkage with the reflection unit and a sensor unit that includes an output unit and a detection unit. When the reflection unit reaches a predetermined swing angle, the blocking unit blocks a path of a detection target between the output unit and the detection unit of the sensor unit and it is possible to detect that the reflection unit has reached the predetermined swing angle. Therefore, it is possible not to design a complex optical path, and it is possible to detect an accurate angle of the reflection unit with a simple configuration. Hereinafter, the above "predetermined swing angle" will be referred to as a "swing detection angle."

In the embodiments of the invention, as the detection target, for example, light, electromagnetic waves, an electric field, and a magnetic field can be used, but light is used in one or some exemplary embodiments. In this case, the output unit of the sensor unit is a light emission unit configured to emit light, and the detection unit of the sensor unit is a light detection unit configured to detect light emitted from the light emission unit.

Embodiments of the invention will be described below with reference to the drawings.

First Embodiment

FIG. 1 is a perspective view schematically showing an optical scanning device according to a first embodiment of the invention. As shown in FIG. 1, an optical scanning device 1 includes a reflection unit 3 that periodically swings about a rotation axis 2 in the positive (+) direction and the negative (−) direction. In the reflection unit 3, a blocking unit 4 having an arc equidistant with respect to a point on the rotation axis 2 is provided, and the blocking unit 4 also swings in linkage with swinging of the reflection unit 3. Thus, on a swing path of the blocking unit 4, a sensor unit 6 including a light detection unit 5 configured to detect a position of the blocking unit 4 is installed. When an angle of the reflection unit 3 is in a range of the swing detection angle, light incident on the light detection unit 5 is blocked by the blocking unit 4.

Figure 2A:
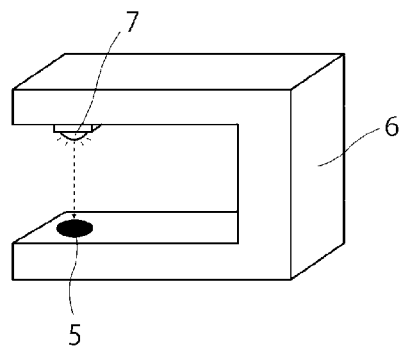
FIGS. 2(A) and 2(B) are diagrams schematically showing an example of a detector.
Figure 2B:
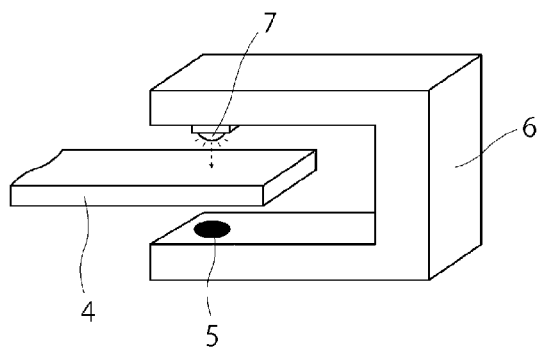

FIGS. 2(A) and 2(B) schematically show an example of the sensor unit 6 including the light detection unit 5. As shown in FIG. 2(A), the sensor unit 6 includes the light detection unit 5 configured to detect light and includes a light emission unit 7 at a position that faces the light detection unit 5. As the light emission unit 7, for example, a light emitting element such as a light emitting diode can be used. In this case, a filter can be provided in the light detection unit 5 so that only light with a specific wavelength is detected. In addition, when electromagnetic waves other than light are used as the detection target, an electromagnetic wave generating element or the like can be used as the output unit. In this case, the sensor unit 6 includes the detection unit 5 configured to detect electromagnetic waves and the like.

FIG. 2(A) shows a state of the sensor unit 6 when no blocking unit 4 is positioned between the light emission unit 7 and the light detection unit 5. FIG. 2(B) shows a state of the sensor unit 6 when the blocking unit 4 is positioned between the light emission unit 7 and the light detection unit 5. In the state in FIG. 2(A), since light emitted from the light emission unit 7 enters the light detection unit 5, the detection signal is brought into an on state.

On the other hand, in the state in FIG. 2(B), light emitted from the light emission unit 7 is blocked by the blocking unit 4, no light enters the light detection unit 5, and the detection signal is brought into an off state. The blocking unit 4 is swung to pass between the light detection unit 5 and the light emission unit 7, and it is possible to detect an angle of the reflection unit 3 at a timing at which the state in FIG. 2(A) and the state in FIG. 2(B) are switched between.

In the embodiments of the invention, when the swing angle of the reflection unit is the swing detection angle, the blocking unit blocks a path of the detection target between the output unit and the detection unit. In the first embodiment of the invention, a case in which the blocking unit 4 is positioned between the output unit (the light emission unit 7) and the detection unit (the light detection unit 5), and light that passes between the output unit (the light emission unit 7) and the detection unit (the light detection unit 5) is blocked is exemplified. In this manner, in the embodiments of the invention, when the detection unit and the blocking unit come close to each other and the detection target incident on the detection unit is blocked, it is possible to obtain a sharp detection signal in which an on state and an off state of a detection signal can be clearly distinguished and it is possible to detect an angle of the reflection unit more accurately. In addition, since information on a position at which the sensor unit is mounted is necessary to detect an angle of the reflection unit, when a detection signal based on the position information is obtained, it is possible to detect an angle of the reflection unit more accurately.

Figure 3:
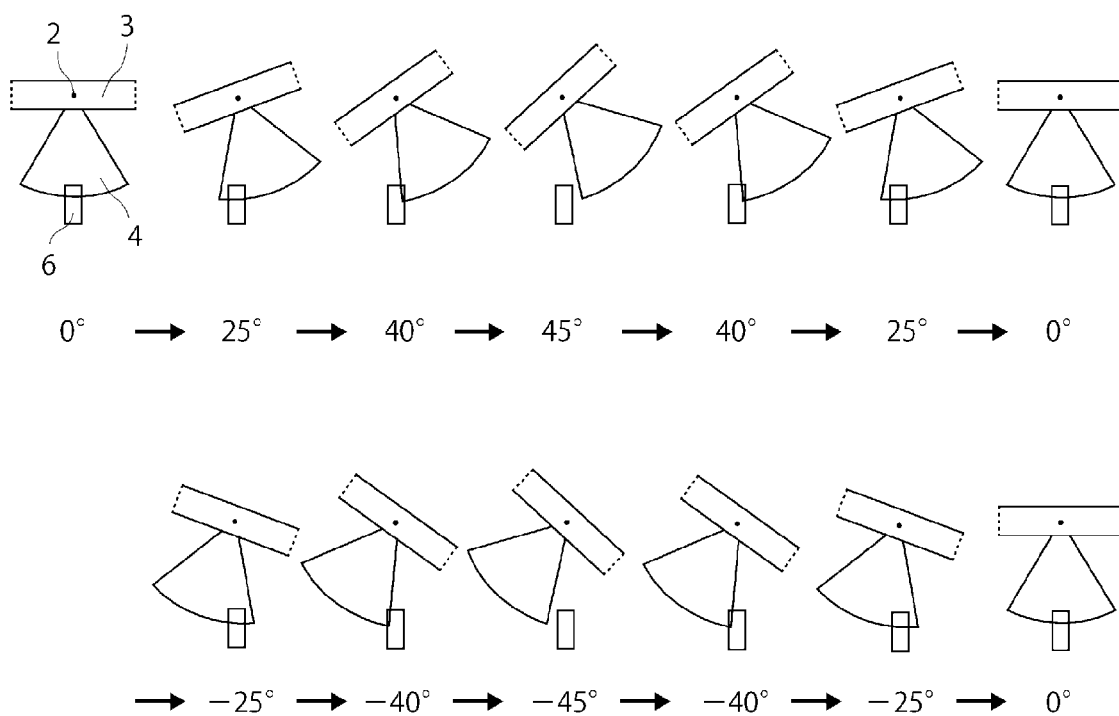
FIG. 3 is a diagram schematically showing states in which the optical scanning device of the first embodiment swings.

FIG. 3 is a diagram schematically showing states in which the reflection unit 3 and the blocking unit 4 periodically swing. FIG. 3 shows diagrams of the optical scanning device of the first embodiment when viewed in a direction of the rotation axis 2 and changes over time in the order shown by arrows.

In the reflection unit 3 in FIG. 3, the blocking unit 4 having a fan shape in a resting state is formed laterally symmetrically.

Therefore, as shown in FIG. 3, when a swing angle of the reflection unit 3 is 0°, the blocking unit 4 blocks light incident on the light detection unit of the sensor unit 6. When the reflection unit 3 rotates about the rotation axis 2, the swing angle of the reflection unit gradually increases. Thus, when the swing angle reaches +40°, the blocking unit 4 is away from the light emission unit and the light detection unit of the sensor unit 6, and light enters the light detection unit of the sensor unit 6. Therefore, it is possible to detect that the swing angle of the reflection unit 3 has reached +40°.

The reflection unit 3 further rotates. However, when the swing angle reaches +45°, the reflection unit 3 starts to rotate reversely and the swing angle gradually decreases. Thus, when the swing angle reaches +40°, the blocking unit 4 is positioned between the light emission unit and the light detection unit of the sensor unit 6 and light incident on the light detection unit of the sensor unit 6 is blocked. Therefore, it is possible to detect that the swing angle of the reflection unit 3 has returned to +40°. According to the change over time in an arrow direction, the reflection unit 3 further rotates, and when the swing angle reaches −40°, the blocking unit 4 is away from the sensor unit 6, and light enters the light detection unit of the sensor unit 6. Therefore, it is possible to detect that the swing angle of the reflection unit 3 has reached −40°.

The reflection unit 3 further rotates. However, when the swing angle reaches −45°, the reflection unit 3 starts to rotate reversely. When the swing angle reaches −40°, the blocking unit 4 approaches the sensor unit 6, and light incident on the light detection unit of the sensor unit 6 is blocked. Therefore, it is possible to detect that the swing angle of the reflection unit 3 has returned to −40°. The reflection unit 3 further rotates and the swing angle returns to a state of 0°. The reflection unit 3 and the blocking unit 4 periodically repeat the above swing.

In the optical scanning device of the embodiments of the invention, as in the first embodiment, the blocking unit is mounted on the reflection unit so that the blocking unit can operate in linkage with the reflection unit. In order for the blocking unit to operate in linkage with the reflection unit, the blocking unit may be mounted on a member connected to the reflection unit. In addition, according to a mechanical mechanism using a gear or the like, the blocking unit may operate in linkage with the reflection unit. When the blocking unit is directly mounted on the reflection unit, it can be mounted through a connection part that connects the reflection unit and the blocking unit. In addition, the reflection unit and the blocking unit can be integrally formed. In this case, the blocking unit can be mounted on a reflection surface of the reflection unit or a back surface of the reflection surface. When the blocking unit is integrally formed with and mounted on the reflection unit, if a U-shaped notch is provided in the reflection unit and that part is bent and "cut and raised" so that it is substantially perpendicular to the reflection unit, the blocking unit can be provided on the reflection unit.

The blocking unit is, for example, a flat blocking plate. When the blocking plate is mounted on the reflection unit, the blocking plate may be mounted so that it intersects a plane of the reflection unit, and the blocking plate can be mounted so that it is parallel to a plane of the reflection unit.

In the embodiments of the invention, when the reflection unit reaches the swing detection angle, the detection target incident on the detection unit is blocked by the blocking unit. Here, the swing detection angle is an "angle at which detection is to start" and is −40° or +40° in the first embodiment.

In the optical scanning device of the embodiments of the invention, in addition to the reflection unit, the blocking unit, and the sensor unit, a light source for emitting scanning light, an actuator for swinging the reflection unit, and a control circuit for controlling the actuator, the sensor unit, and the like can be provided.

As the light source, a laser light source, an LED light source, an SLD light source, or the like can be used. Among them, the laser light source can be suitably used because it is a light source with high directivity. The actuator for swinging the reflection unit is not limited thereto. For example, an actuator using a piezoelectric element or a magnetic force and an actuator using electrostatic attraction can be used.

As the sensor unit used in the embodiments of the invention, a sensor unit capable of detecting light, radio waves, X-rays, gamma rays, sound waves, physical contact, or the like can be used. Here, when light is used, the blocking unit is, for example, a light blocking unit made of a light blocking material through which light does not pass. As a light detection unit configured to detect light, a light receiver configured to detect visible light, infrared rays, ultraviolet rays or the like can be used.

Figure 4:
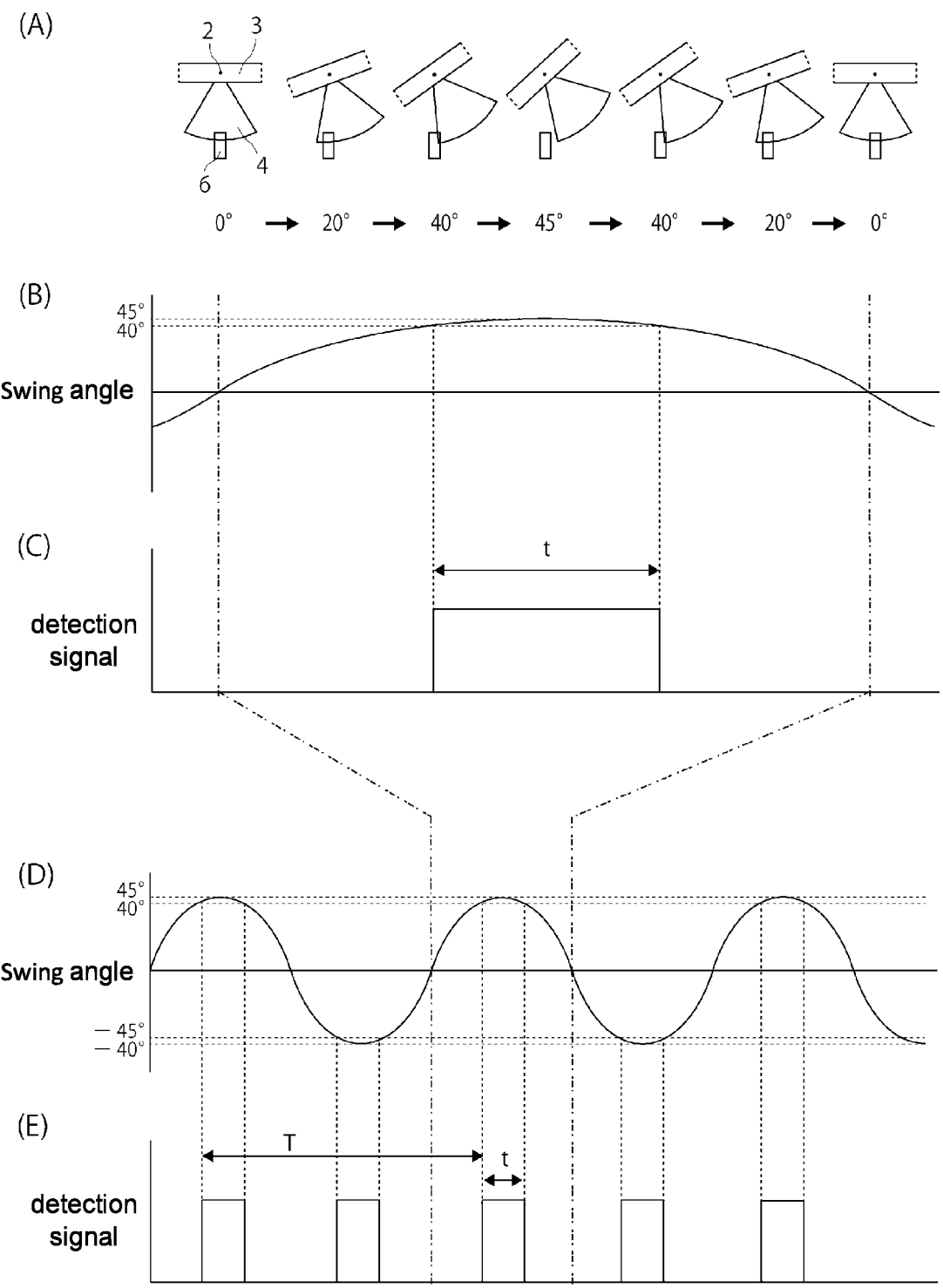
FIG. 4 is a diagram schematically showing a state in which an on state and an off state of a detection signal are switched between in the optical scanning device of the first embodiment. (A) of FIG. 4 is a diagram schematically showing a state in which a reflection unit swings. (B) of FIG. 4 is a graph showing a change in swing angle of the reflection unit that swings as shown in (A) of FIG. 4 over time, in which the vertical axis represents the swing angle and the horizontal axis represents a time. (C) of FIG. 4 is a graph showing a signal (detection signal) detected by a sensor unit, in which the vertical axis represents a strength of a detection signal and the horizontal axis represents a time. (D) of FIG. 4 is a graph showing a change in swing angle over time for a longer time than in (B) of FIG. 4. (E) of FIG. 4 is a graph showing a detection signal for a longer time than in (C) of FIG. 4. In (B) to (E) of FIG. 4, ranges surrounded by dashed lines indicate times of the same length.

FIG. 4 schematically shows a state in which an on state and an off state of a detection signal are switched between in the optical scanning device of the first embodiment shown in FIG. 3. (A) of FIG. 4 is a diagram schematically showing a state in which the reflection unit swings. (B) of FIG. 4 is a graph showing a change in swing angle of the reflection unit that swings as in (A) of FIG. 4 over time, in which the vertical axis represents a swing angle and the horizontal axis represents a time. (C) of FIG. 4 is a graph showing a signal (detection signal) detected by the sensor unit, in which the vertical axis represents a strength of a detection signal and the horizontal axis represents a time. (D) of FIG. 4 is a graph showing a change in swing angle over time for a longer time than in (B) of FIG. 4. (E) of FIG. 4 is a graph showing a detection signal for a longer time than in (C) of FIG. 4. In (B) to (E) of FIG. 4, ranges surrounded by dashed lines indicate times of the same length.

In FIG. 3 (or (A) of FIG. 4), in a resting state of the reflection unit 3, the blocking unit 4 having a fan shape is formed laterally symmetrically. Therefore, when light incident on the light detection unit of the sensor unit 6 is blocked by the blocking unit 4, as shown in (C) of FIG. 4, the detection signal is brought into an off state. However, as shown in (A) of FIG. 4, when the swing angle reaches 40° and the sensor unit 6 and the blocking unit 4 are far from each other, the detection signal is brought into an on state, and as shown in (C) of FIG. 4, the detection signal is detected. The on state of the detection signal continues for a t time until the sensor unit 6 detects the blocking unit 4 again (until the swing angle returns to 40°). As shown in (D) of FIG. 4 and (E) of FIG. 4, while the reflection unit 3 periodically swings, such a pulse of the detection signal periodically appears. In the first embodiment, since the blocking unit 4 is laterally symmetrical in the resting state of the reflection unit 3, irrespective of whether it swings to the positive (+) side or the negative (−) side, a pulse having the same time width t appears. A period (T) of swinging can be calculated by measuring an interval (T/2) between pulses that appear in the detection signal and doubling the width.

In the embodiments of the invention, the swing detection angle can be set using an angular difference between the edge of the light blocking unit in the resting state of the reflection unit and the detector.

That is, in the optical scanning device of the embodiments of the invention, when a position of the sensor unit is set so that it can move along a swing trajectory of the blocking unit, it is possible to change an angle of the reflection unit when the detection unit detects the blocking unit.

Figure 5A:
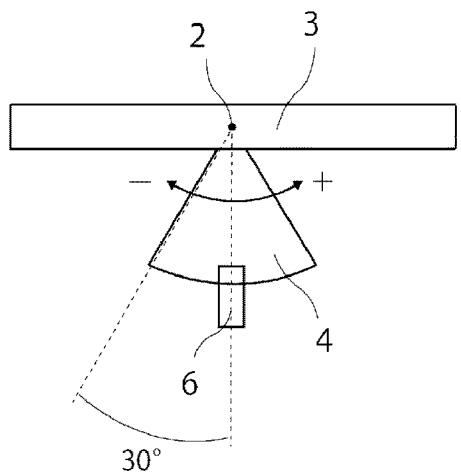
FIGS. 5(A) and 5(B) are diagrams schematically showing an example in which a position of the optical scanning device of the first embodiment sensor unit is changed.
Figure 5B:
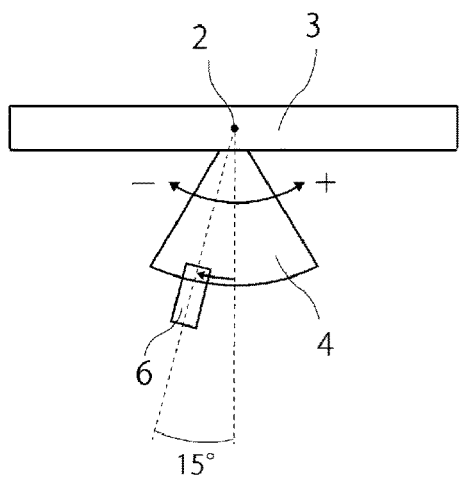

FIGS. 5(A) and 5(B) schematically show an example in which a position of a sensor unit is changed in the optical scanning device of the first embodiment. FIGS. 5(A) and 5(B) are diagrams of the optical scanning device when viewed in a direction around the axis of the rotation axis 2. FIG. 5(A) shows a state before a position of the sensor unit including a light detection unit is changed, and FIG. 5(B) shows a state after a position of the sensor unit including a light detection unit is changed.

As shown in FIG. 5(A), the reflection unit 3 and the blocking unit 4 periodically swing about the rotation axis 2 in the positive (+) direction and the negative (−) direction. Thus, when the swing angle of the reflection unit 3 is in a swing angle range of −30° to +30°, light input to the light detection unit of the sensor unit 6 is blocked by the blocking unit 4. Here, as shown in FIG. 5(B), when the sensor unit 6 is moved along a swing trajectory of the blocking unit 4, an angle at which light is blocked by the blocking unit 4 is changed to an angle range of −45° to +15°. Therefore, it is possible to change an angle at which the sensor unit detects the blocking unit.

The position of the sensor unit may be changed manually. However, a detection angle adjustment mechanism by which a position of the sensor unit is automatically changed according to an angle to be detected is provided in one or some exemplary embodiments. The detection angle adjustment mechanism can include, for example, a rotation mechanism that rotates about a rotation axis and moves the sensor unit and an actuator configured to automatically control the rotation mechanism.

As described above, in the modified example in FIG. 5(B), the reflection unit 3 is laterally symmetrical with respect to a resting position, but the position of the sensor unit is deviated from the center and the swing detection angle is set to be different on the + side and the − side.

When the swing detection angle is set to be different on the + side and the − side, a pulse width of the detection signal can be different on the + side and the − side. According to this pulse width detection, for example, it is possible to easily determine a swing direction in the control circuit.

Second Embodiment

Figure 6:
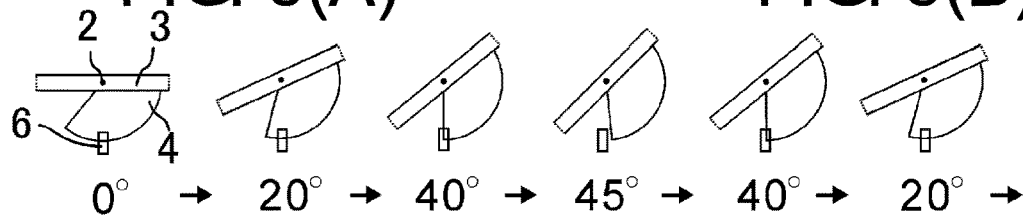
FIG. 6 is a diagram schematically showing a state in which a reflection unit swings in an optical scanning device of a second embodiment.
Figure 6:
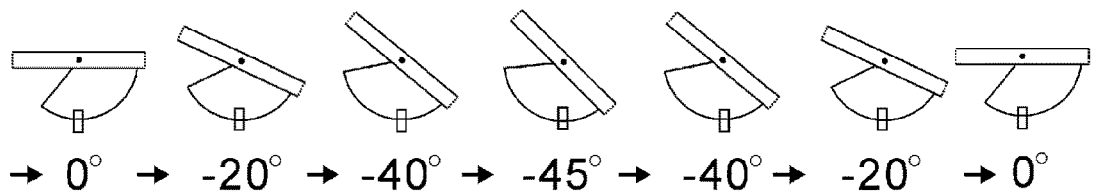

FIG. 6 is a diagram showing an embodiment in which light from the light emission unit of the sensor unit 6 is masked on either of the + side and the − side (the − side in the present embodiment).

FIG. 6 is a diagram schematically showing a state in which the reflection unit swings. In FIG. 6, in the blocking unit 4, a part corresponding to one string of the light blocking unit having a fan shape is formed as an edge.

The part corresponding to one string is positioned on a surface of the reflection unit 3 (the fan shape is closed on the surface of the reflection unit 3), and light from the light emission unit is masked on the − side.

Figure 7:
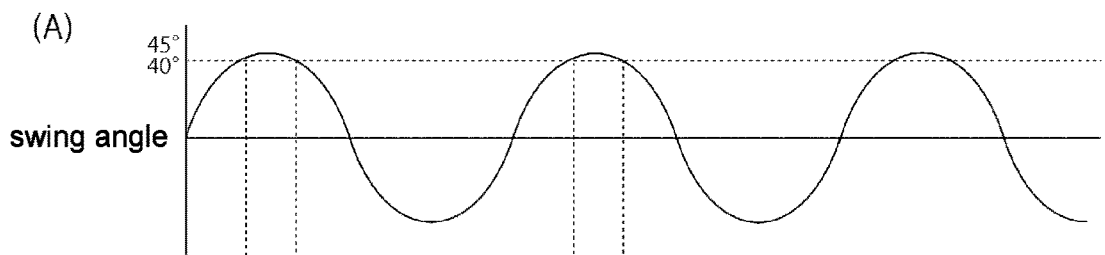
FIG. 7 is a diagram schematically showing a state in which an on state and an off state of a detection signal are switched between in the optical scanning device of the second embodiment. (A) of FIG. 1 is a graph showing a change in swing angle of a reflection unit over time, in which the vertical axis represents a swing angle and the horizontal axis represents a time. (B) of FIG. 7 is a graph showing a signal (detection signal) detected by a sensor unit, in which the vertical axis represents a strength of a detection signal and the horizontal axis represents a time.

(A) of FIG. 7 is a graph showing a change in swing angle over time and (B) of FIG. 7 is a graph showing a detection signal. As can be understood from (A) and (B) of FIG. 7, a pulse of the detection signal appears on the + side, but does not appear on the − side.

In the present embodiment, since a pulse of the detection signal does not appear on the + side, a period (T) of swinging can be detected by measuring an interval of the pulse.

Third Embodiment

Figure 8:
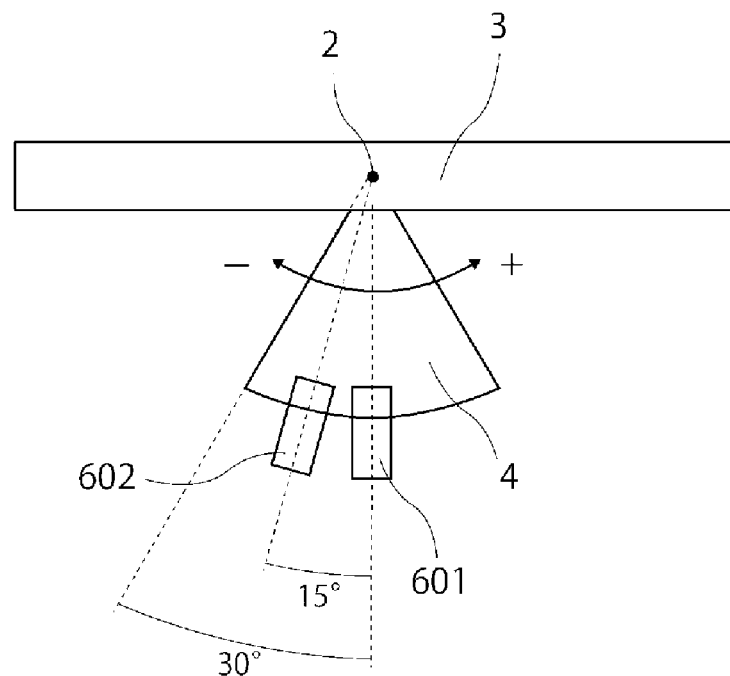
FIG. 8 is a diagram schematically showing an optical scanning device of a third embodiment in which a plurality of sensor units are provided.

In an optical scanning device of the embodiments of the invention, it is possible to increase an angle range that can be detected by increasing the number of sensor units. FIG. 8 schematically shows an optical scanning device of the third embodiment in which a plurality of sensor units are provided. FIG. 8 is a diagram of the optical scanning device when viewed in a direction of the rotation axis 2.

As shown in FIG. 8, the reflection unit 3 and the blocking unit 4 periodically swing about the rotation axis 2 in the + direction and the − direction. In a first sensor unit 601, when a swing angle of the reflection unit 3 is in a swing angle range of −30° to +30°, a light path between the light emission unit and the light detection unit of the sensor unit is blocked by the blocking unit 4, and the detection signal is brought into an off state. Therefore, when the detection signal is changed from an off state to an on state or when the detection signal is changed from an on state to an off state, the swing angle of the reflection unit 3 is −30° or +30°.

Here, it is possible to determine whether the swing angle is −30° or +30° with reference to a detection signal of a second sensor unit 602. That is, when the swing angle is −30°, the second sensor unit 602 is blocked by the blocking unit 4 and the detection signal is brought into an off state. When the swing angle is +30°, the second sensor unit 602 is not blocked by the blocking unit 4, and the detection signal is brought into an on state. Therefore, it is possible to determine whether the swing angle is −30° or +30° according to the detection signal of the second sensor unit 602.

In addition, when the swing angle of the reflection unit 3 is in an angle range of −45° to +15°, the second sensor unit 602 is blocked by the blocking unit 4, and the detection signal is brought into in an off state. Therefore, when the detection signal is changed, the swing angle of the reflection unit 3 is −45° or +15°. Here, −45° and +15° can be determined according to the detection signal of the first sensor unit 601.

As described above, as shown in FIG. 8, according to the third embodiment in which a plurality of detectors are provided, four angles, −45°, −30°, +15° and +30°, can be detected.

The optical scanning device of the embodiments of the invention can have a configuration in which, if a plurality of sensor units are disposed along a swing trajectory of the blocking unit, when the reflection unit is at a first position, the blocking unit is positioned between the output unit and the detection unit of the first sensor unit, and when the reflection unit is at a second position, the blocking unit is positioned between the output unit and the detection unit of the second sensor unit. Here, for example, in the configuration, when the reflection unit is in a predetermined first swing angle range, the blocking unit is positioned between the output unit and the detection unit of the first sensor unit, and when the reflection unit is in a predetermined second swing angle range, the blocking unit is positioned between the output unit and the detection unit of the second sensor unit. Therefore, it is possible to detect an angle range of the first swing angle range, the second swing angle range, an angle range in which the first swing angle range and the second swing angle range overlap, and an angle range that is not included in the first swing angle range or the second swing angle range that the reflection unit is in.

Fourth Embodiment

In an optical scanning device of the embodiments of the invention, it is possible to increase the number of angles that can be detected by increasing the number of blocking units.

Figure 9:
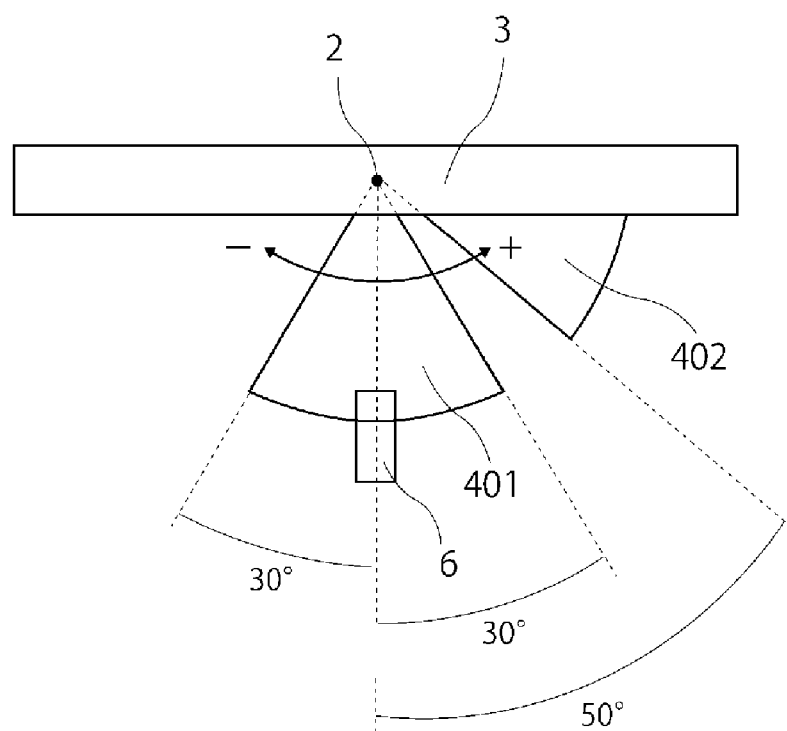
FIG. 9 is a diagram schematically showing an optical scanning device of a fourth embodiment in which a plurality of blocking units are provided.

FIG. 9 schematically shows an optical scanning device of the fourth embodiment in which a plurality of blocking units are provided. FIG. 9 is a diagram of the optical scanning device when viewed in a direction of the rotation axis 2. As shown in FIG. 9, the optical scanning device of the fourth embodiment includes a first blocking unit 401 and a second blocking unit 402. The first blocking unit 401 is detected by the sensor unit 6 in an angle range of −30° to +30°. Thus, the second blocking unit 402 can be detected by the sensor unit 6 when it swings to the − side from −50°. Therefore, the optical scanning device of the fourth embodiment can detect three angles, −50°, −30°, and +30°.

The optical scanning device of the embodiments of the invention can have a configuration in which, if a plurality of blocking units are provided on the reflection unit, when the reflection unit is at a first position, the first blocking unit is positioned between the output unit and the detection unit of the sensor unit, and when the reflection unit is at a second position, the second blocking unit is positioned between the output unit and the detection unit of the sensor unit. Here, in the configuration, for example, when the reflection unit is in a predetermined first swing angle range, the first blocking unit is positioned between the output unit and the detection unit of the sensor unit, and when the reflection unit is in a predetermined second swing angle range, the second blocking unit is positioned between the output unit and the detection unit of the sensor unit. Therefore, it is possible to detect an angle range of the first swing angle range, the second swing angle range, and an angle range that is not included in the first swing angle range or the second swing angle range that the reflection unit is in.

Fifth Embodiment

Figure 10:
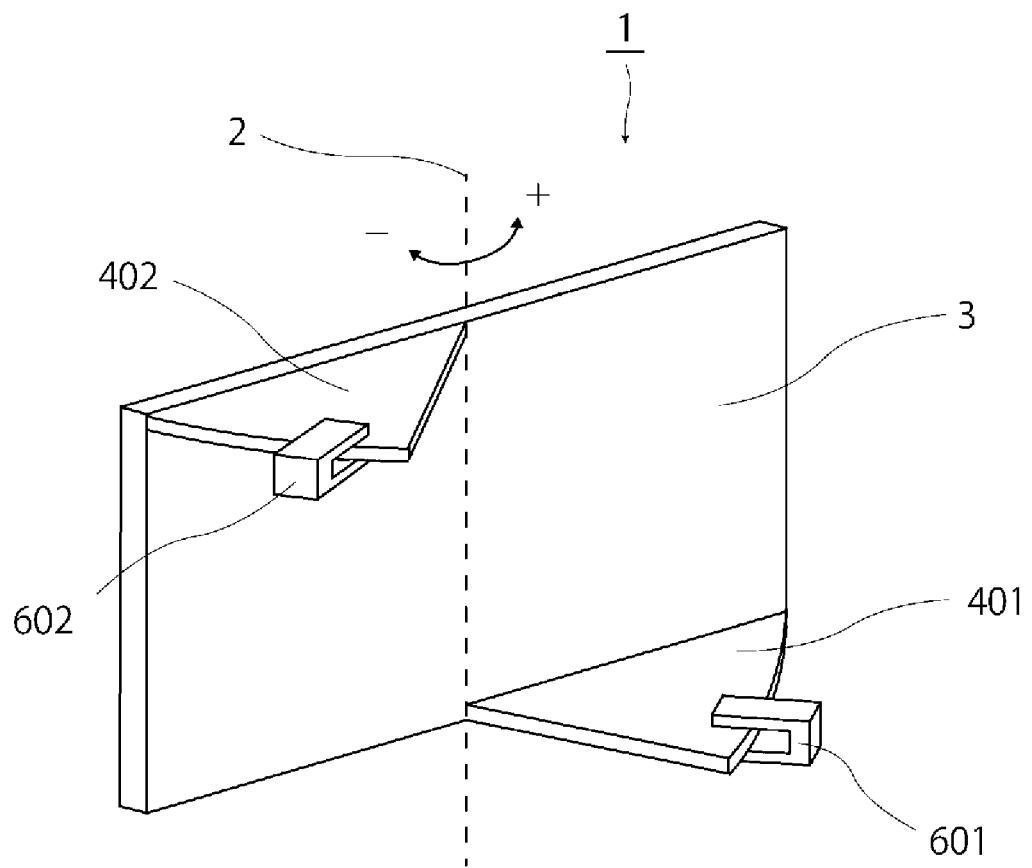
FIG. 10 is a perspective view schematically showing an optical scanning device of a fifth embodiment in which a plurality of sensor units and a plurality of blocking units are provided.

In an optical scanning device of the embodiments of the invention, a plurality of sensor units are provided and a plurality of blocking units are provided so that it is possible to increase a degree of freedom of detection angle. FIG. 10 is a perspective view schematically showing an optical scanning device of a fifth embodiment in which a plurality of sensor units and a plurality of blocking units are provided.

As shown in FIG. 10, the reflection unit 3 periodically swings about the rotation axis 2 in the + direction and the − direction. In the reflection unit 3, the first blocking unit 401 and the second blocking unit 402 are provided. The first blocking unit 401 approaches the sensor unit 601 including a first light detection unit and blocks light incident on the first light detection unit. The second blocking unit 402 approaches the sensor unit 602 including a second light detection unit and blocks light incident on the second light detection unit.

When the reflection unit 3 is inclined by a predetermined angle or more in the + angle direction, the first blocking unit 401 is away from the sensor unit 601 including a first light detection unit, blocking is released, and thus a detection signal of the sensor unit 601 including a first light detection unit is brought into an on state. Therefore, it is possible to detect a swing angle in the + angle direction. The sensor unit 601 including a first light detection unit can be moved along a swing trajectory of the first blocking unit 401. Accordingly, it is possible to change an angle to be detected, and it is possible to detect any angle in the + angle direction.

When the reflection unit 3 swings a predetermined angle or more in the − direction, the second blocking unit 402 is away from the sensor unit 602 including a second light detection unit, and blocking of a light path between the light emission unit and the light detection unit in the detector is released, and thus a detection signal of the sensor unit 602 including a second light detection unit is brought into an on state. Therefore, it is possible to detect a swing angle in the − direction. The sensor unit 602 including a second light detection unit can be moved along a swing trajectory of the second blocking unit 402. Accordingly, it is possible to change an angle to be detected, and it is possible to detect any angle in the − direction.

As described above, the optical scanning device of the fifth embodiment shown in FIG. 10 can detect any swing angle of the reflection unit 3 in the + direction and the − direction.

The optical scanning device in the embodiments of the invention includes a shaft part that is provided on both sides of the reflection unit and a support part that rotatably supports the shaft part. In the optical scanning device, when the shaft part rotates, the reflection unit swings.

Here, "both sides of the reflection unit" are two portions on the rotation axis of the reflection unit, and the support part rotatably supports the shaft part at the two portions. In addition, "rotatably supporting the shaft part" means that the shaft part rotates from a forward direction to a reverse direction and then rotates from a reverse direction to a forward direction so that it is supported swingable, and does not mean that it continuously rotates in one direction.

Here, the shaft part and the support part may be configured as a shaft and a bearing (slide bearing), or the shaft part and the support part may be connected to each other so that they swing by a twisting motion. When the shaft part and the support part are connected to each other and twisted, since the reflection unit can be swung without a complex mechanism including a shaft and a bearing, the size of the optical scanning device can be reduced.

In the optical scanning device of the embodiments of the invention, as in the first embodiment to the fifth embodiment, the shape of the blocking unit can be a shape of which at least a part has an arc equidistant with respect to a point on the rotation axis of the reflection unit which is on the same axis as the shaft part. In this case, for example, the blocking unit is a flat blocking plate and the blocking plate is provided so that it is perpendicular to the reflection unit.

Here, in addition, when a notch is formed in a part of the arc equidistant with respect to a point on the rotation axis of the reflection unit that is on the same axis as the shaft part, it is possible to arbitrarily set an angle range in which light incident on the sensor unit is blocked by the blocking plate.

Sixth Embodiment

Figure 11:
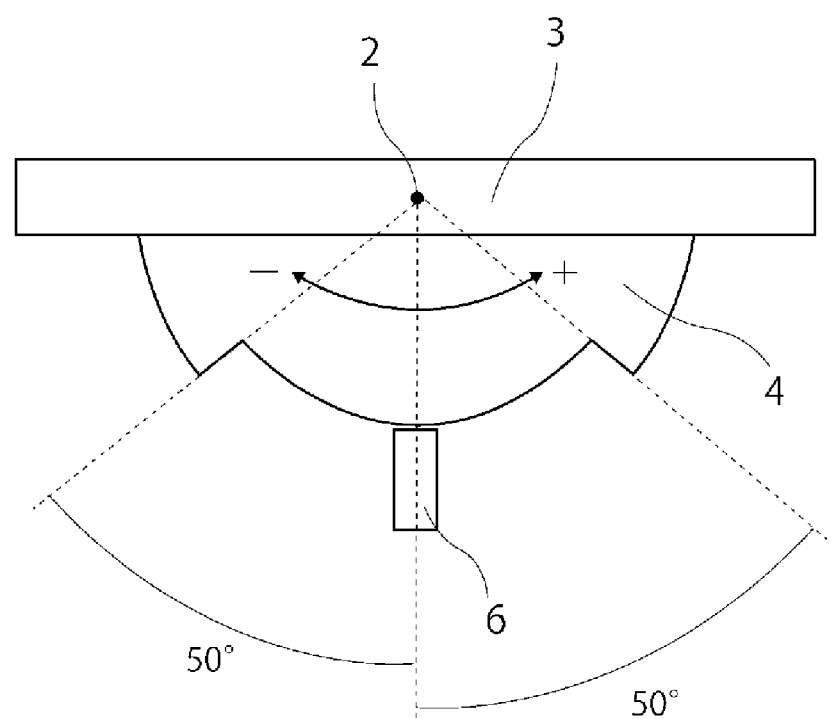
FIG. 11 is a diagram schematically showing an optical scanning device of a sixth embodiment in which a circular arc-shaped blocking unit of which a part has a notch is provided.

FIG. 11 schematically shows an optical scanning device of a sixth embodiment in which a circular arc-shaped blocking plate of which a part has a notch is provided. FIG. 11 is a diagram of the optical scanning device when viewed in a direction of the rotation axis 2. As shown in FIG. 11, in a semicircular blocking plate (blocking unit 4), a notch is provided in a range of −50° to +50°. While the reflection unit 3 swings in a range of −50° to +50°, since the blocking unit 4 does not block a space between the light emission unit and the light detection unit of the sensor unit 6, the sensor unit 6 does not detect the blocking unit 4. On the other hand, when the reflection unit 3 swings 50° or more in the + angle direction or 50° or more in the − angle direction, light incident on the light detection unit of the sensor unit 6 is blocked by the blocking plate 4, and the sensor unit 6 can detect a swing angle of the reflection unit 3.

The optical scanning device of the sixth embodiment shown in FIG. 11 can be used to perform control such that emission of light from the light source is stopped, for example, when the reflection unit 3 is inclined by 50° or more in the + direction or 50° or more in the − direction.

When the reflection unit 3 periodically swings in the + direction and the − direction, as shown in (D) of FIG. 4, it does not rotate at a certain speed, but it is driven in a sinusoidal manner, and at an end point at which an absolute value of the swing angle is a maximum and a rotation direction is reversed, rotation is instantaneously stopped. Therefore, at the end point, since laser light emitted from the light source or the like is focused on and emitted to one point, there is a problem of safety for the human eye and the like. Therefore, when the reflection unit swings by a predetermined angle or more, if the swing angle is detected using the optical scanning device of the sixth embodiment, and emission of light from the light source is stopped, it is possible to ensure safety of the optical scanning device.

In the optical scanning device of the embodiments of the invention, the blocking unit can be used so that a degree of blocking of electromagnetic waves by the blocking unit gradually changes.

In the optical scanning device of the embodiments of the invention, the shape of the blocking unit can be a gear shape that has a plurality of arcs equidistant with respect to the rotation axis.

Seventh Embodiment

Figure 12:
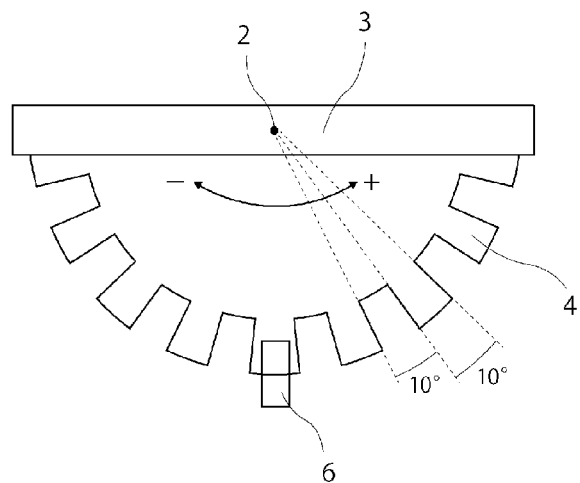
FIG. 12 is a diagram schematically showing an optical scanning device of a seventh embodiment in which a gear-shaped blocking unit is provided. (A) of FIG. 12 is a diagram of an optical scanning device of a seventh embodiment when viewed in a direction of a rotation axis 2. (B) of FIG. 12 is a graph showing a change in swing angle of a reflection unit over time, in which the vertical axis represents a swing angle and the horizontal axis represents a time. (C) of FIG. 12 is a graph showing a signal (detection signal) detected by a sensor unit, in which the vertical axis represents a strength of a detection signal and the horizontal axis represents a time.
Figure 12:
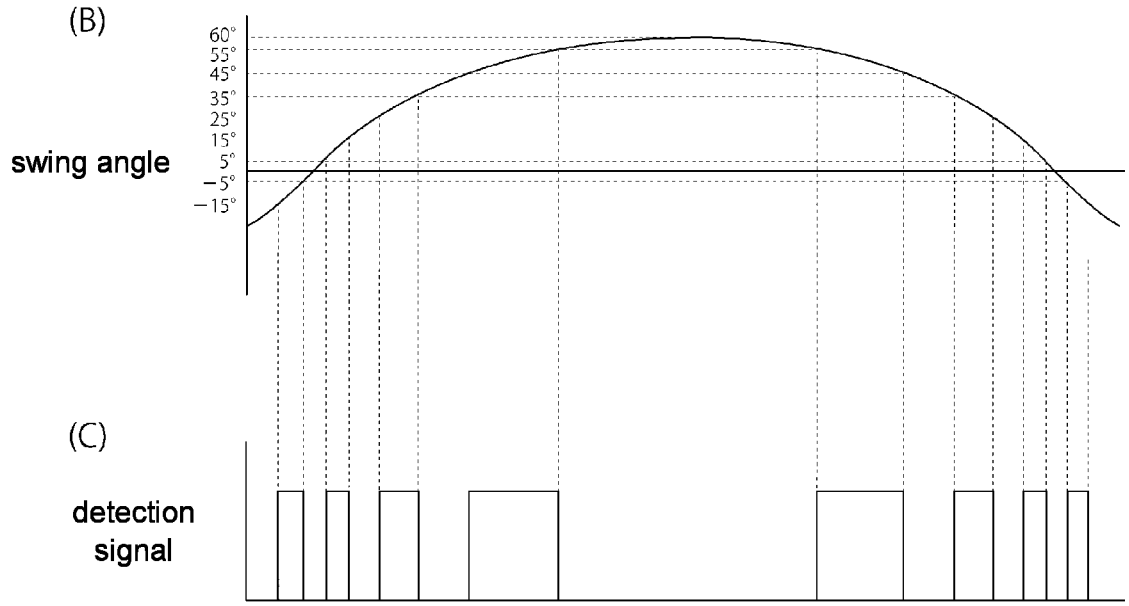

FIG. 12 schematically shows an optical scanning device of a seventh embodiment in which a gear-shaped blocking unit is provided. (A) of FIG. 12 is a diagram of the optical scanning device of the seventh embodiment when viewed in a direction of the rotation axis 2. (B) of FIG. 12 is a graph showing a change in swing angle of the reflection unit over time, in which the vertical axis represents a swing angle and the horizontal axis represents a time. (C) of FIG. 12 is a graph showing a signal (detection signal) detected by the sensor unit, in which the vertical axis represents a strength of a detection signal and the horizontal axis represents a time.

As shown in (A) of FIG. 12, the blocking unit 4 of the optical scanning device of the seventh embodiment has a shape in which notches are formed at intervals of 10° on a semicircular blocking plate and a plurality of arcs are provided at the same interval and equidistant with respect to the center of the rotation axis 2. The reflection unit 3 periodically swings in the + direction and the − direction. However, as shown in (B) of FIG. 12, since the swing angle varies in a sinusoidal manner, when the swing angle is about 0°, the swing speed is high, and when the swing angle is about a maximum angle, the swing speed is low.

Therefore, as shown in (C) of FIG. 12, when the swing angle is about 0°, since the swing speed of the reflection unit is high, a time for which the blocking plate is detected by the detection unit becomes shorter. Therefore, a pulse width of the detection signal decreases. On the other hand, when the swing angle is about a maximum angle, since the swing speed of the reflection unit is low, a time for which the blocking plate is detected by the detection unit becomes longer. Therefore, a pulse width of the detection signal increases. Based on a difference between the pulse widths, it is possible to determine a tooth of the gear to which a pulse detected by the detection unit corresponds, and it is possible to detect the swing angle of the reflection unit 3.

The optical scanning device of the embodiments of the invention can detect an angle using the blocking unit and can allow the blocking unit to have a function of splitting a reflection surface of the reflection unit. The reflection unit of the optical scanning device reflects light from the light source and emits light to a target object, and at the same time, receives reflected light and scattered light from the object, and reflects this light again, which is detected by the sensor unit, and thus it can be used to measure a distance to the object, a shape thereof, a direction, and the like.

Here, when emission of light and reception of light are performed using the same reflection unit, there is a possibility of an unintended surface diffusion and reflection component entering on the light reception side. Therefore, emission light and reflected light are split. In the optical scanning device of the embodiments of the invention, in the reflection unit, a first reflection area (light emission surface) for emitting light and a second reflection area (light reception surface) for receiving reflected light are split by the blocking plate, and thus it is possible to prevent reflected light from entering.

That is, the optical scanning device of the embodiments of the invention further includes a light source configured to generate scanning light. The reflection unit has a reflection surface that includes a first reflection area in which scanning light from the light source is received and reflected toward a first area and a second reflection area in which scanning light that is reflected and returned from the first area is received and reflected toward a second area. The blocking unit can be disposed between the first reflection area and the second reflection area.

Eighth Embodiment

Figure 13:
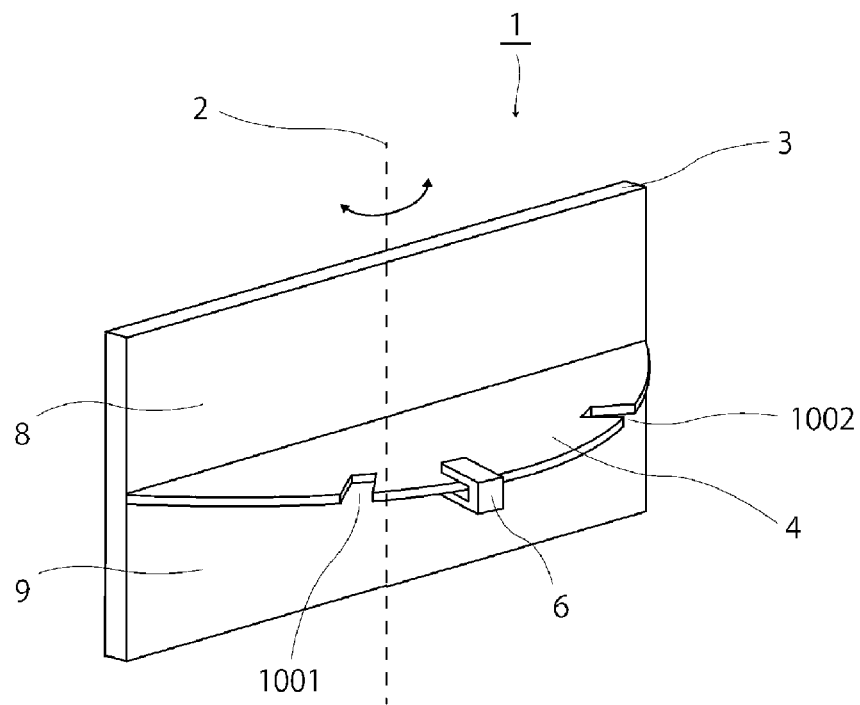
FIG. 13 is a perspective view schematically showing an eighth embodiment in which a blocking unit has a function of splitting a reflection surface.

FIG. 13 is a perspective view schematically showing an eighth embodiment in which a blocking unit has a function of splitting a reflection surface. As shown in FIG. 13, the semicircular blocking unit 4 is provided in the reflection unit 3. Therefore, the reflection surface of the reflection unit 3 is split into a light emission surface 8 for emitting light and a light reception surface 9 for receiving reflected light, and it is possible to prevent reflected light due to unintended surface diffusion and reflection from entering.

Notches 1001 and 1002 are provided in the blocking unit 4. When these notches are positioned along a path of light that is emitted from the light emission unit of the sensor unit 6, blocking between the light emission unit and the detection unit of the sensor unit is released, a detection signal is generated, and accordingly, it is possible to detect an angle of the reflection unit. In addition, the detection method is not limited thereto. A detection signal may be generated when the blocking unit is positioned between the light emission unit and the detection unit of the sensor unit.

Ninth Embodiment

In an optical scanning device of the embodiments of the invention, the blocking unit is a flat blocking plate, and the blocking plate can be provided substantially parallel to an axial direction of the shaft part about which the reflection unit is swung.

Figure 14:
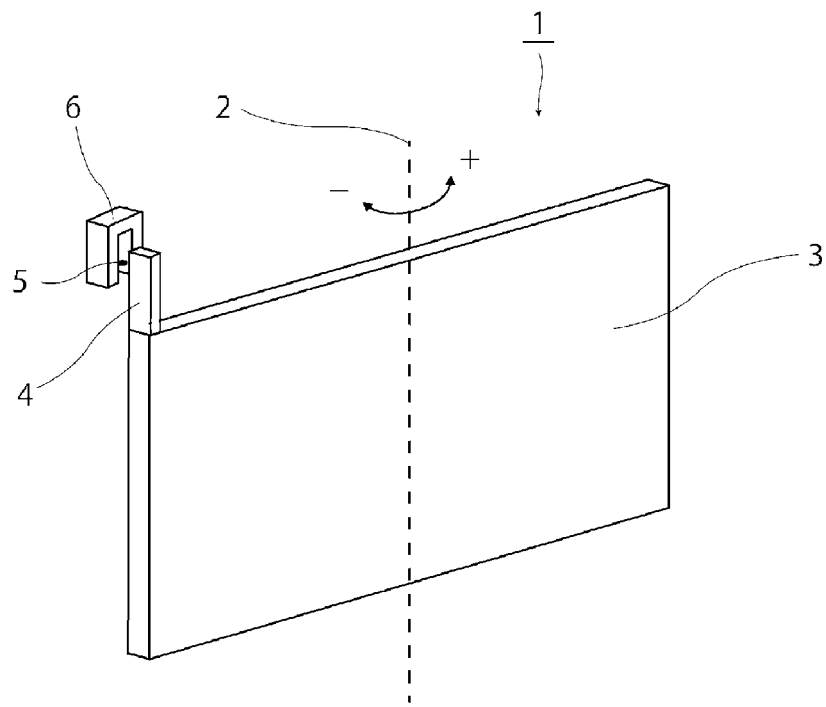
FIG. 14 is a perspective view schematically showing a ninth embodiment in which a blocking plate is provided parallel to an axial direction of a rotation axis.

FIG. 14 is a perspective view schematically showing a ninth embodiment in which a blocking plate is provided parallel to an axial direction of a rotation axis. As shown in FIG. 14, in the reflection unit 3, the blocking plate (blocking unit 4) having a short width is provided parallel to the rotation axis 2. The blocking unit 4 moves in a circumferential direction about the rotation axis 2 as the reflection unit 3 rotates, and passes in front of the light detection unit 5 of the sensor unit 6. When the blocking unit 4 passes between the light emission unit and the light detection unit 5 in the sensor unit 6, light incident on the light detection unit 5 is blocked and it is possible to detect a swing angle of the reflection unit 3.

Figure 15A:
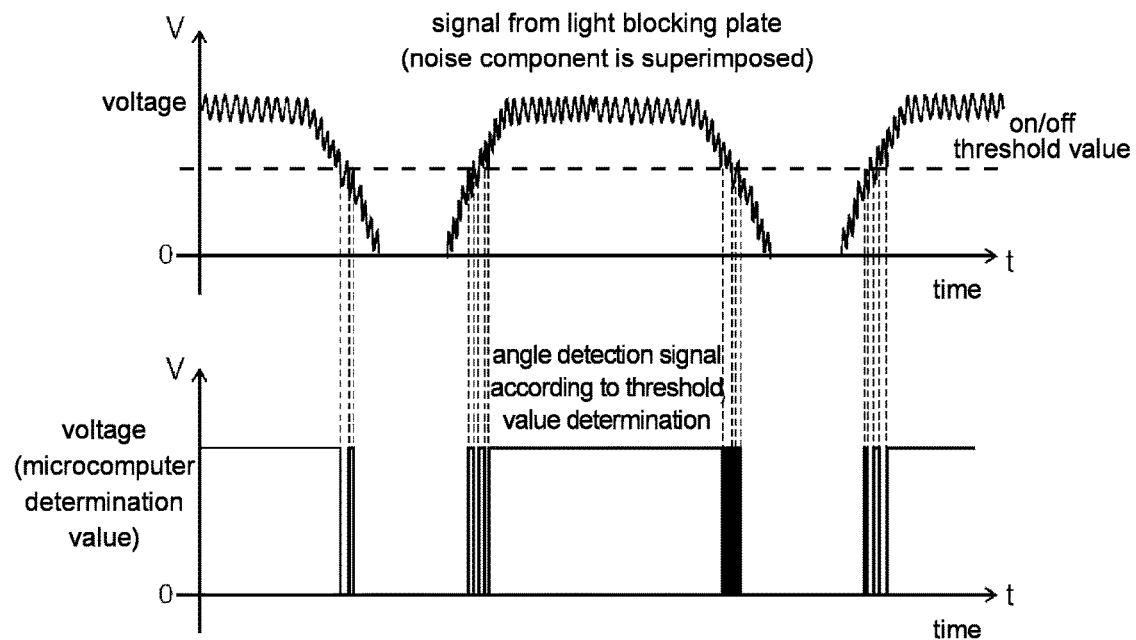
FIGS. 15(A) and 15(B) show diagrams explaining hysteresis characteristics of a detector.
Figure 15B:
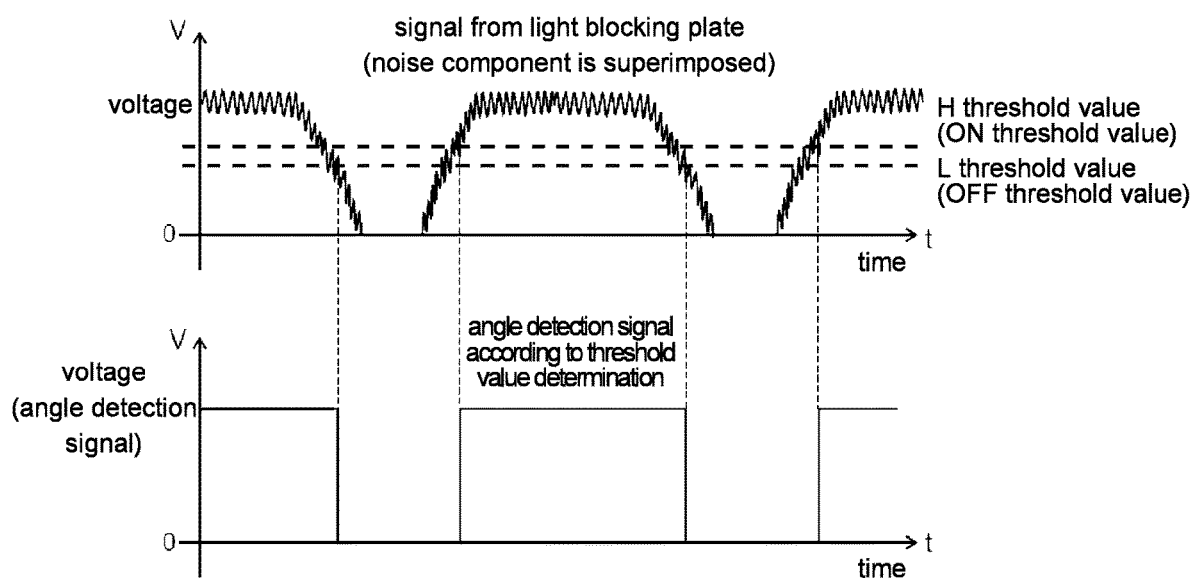

FIGS. 15(A) and 15(B) show diagrams explaining removal of detection noise. FIG. 15(A) is a waveform diagram showing a signal (a signal on which a noise component is superimposed) from a sensor unit having no hysteresis and an angle detection signal according to threshold value determination. FIG. 15(B) is a waveform diagram showing a signal (a signal on which a noise component is superimposed) from a sensor unit having hysteresis and an angle detection signal according to threshold value determination.

When a signal is detected without hysteresis, that is, when one threshold value is used as shown in the waveform diagram (a signal from a light blocking plate) in FIG. 15(A), if a signal from the sensor unit swings at about a threshold value, since an angle detection signal varies finely, many noises are contained in an angle detection signal as shown in the angle detection signal (microcomputer determination value) in the same drawing.

On the other hand, as shown in the waveform diagram (a signal from a light blocking plate) in FIG. 15(B), when a signal is detected with hysteresis, that is, when two threshold values including an H threshold value (ON threshold value) and an L threshold value (OFF threshold value) are used, since ON and OFF of the angle detection signal are switched only when the value varies over the two threshold values in the present embodiment, noise is removed as shown in the same drawing.

2. Method of Detecting Angle

The method of detecting an angle of the reflection unit of the embodiments of the invention is an angle detection method in which a blocking unit is swung in linkage with the reflection unit that swings, the sensor unit detects that the blocking unit has reached a predetermined swing angle, and thus a swing angle of the reflection unit is detected. The sensor unit detects whether a path of a detection target between an output unit configured to output the detection target and a detection unit configured to detect the detection target is blocked by the blocking unit. Therefore, a method of detecting a swing angle of the reflection unit is provided.

In the angle detection method of the embodiments of the invention, optical scanning devices of various variations described in the above 1 can be used, and it is possible to detect an angle of the reflection unit according to the principle described in the above 1.

In the angle detection method of the embodiments of the invention, when a blocking plate with a shape having an arc equidistant with respect to a point on the rotation axis of the reflection unit is used as the blocking unit, the reflection unit is periodically swung about the rotation axis, and the detection target is detected by the sensor unit as a pulse including an off state in which the detection target incident on the detection unit is blocked by the blocking unit and thus no detection target is detected by the detection unit and an on state in which blocking is released and thus the detection target is detected by the detection unit, and it is possible to detect a maximum deflection angle of the reflection unit based on a width and frequency of the pulse and the shape of the blocking unit and the like.

More specifically, when a blocking unit with a shape having an arc equidistant with respect to a point on the rotation axis of the reflection unit is used as the blocking unit, and the reflection unit is periodically swung about the rotation axis, as shown in FIG. 4, it is possible to obtain a value (t) of a pulse width and a value (T) of a swing period. Here, a swing frequency f can be obtained as f=1/T (Hz). Then, when an angular difference between the edge of the light blocking unit in the resting state of the reflection unit and the detector is set as θ, a maximum deflection angle α of the reflection unit can be calculated by α=2θ/cos(2πf(t/2)).

Figure 16:
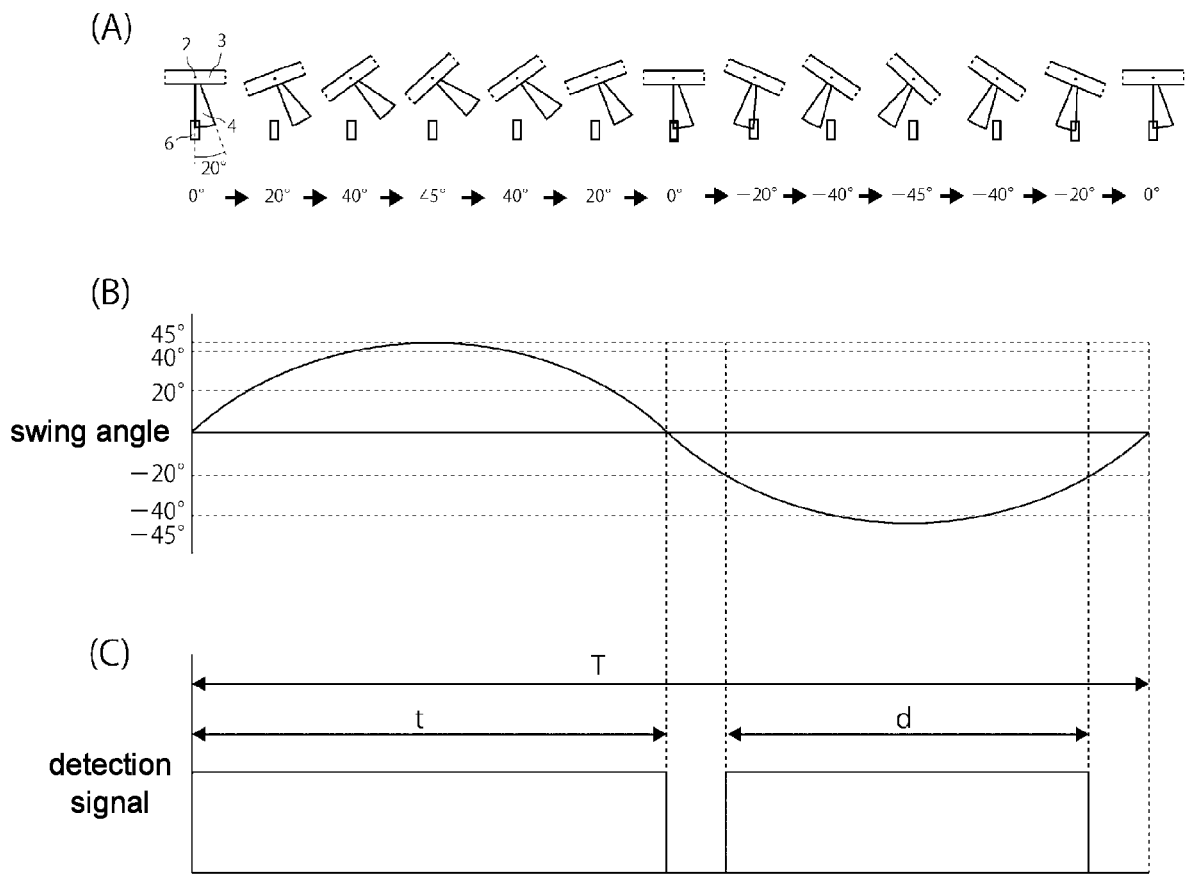
FIG. 16 is a diagram showing detection of a detection signal when a blocking unit swings laterally asymmetrically. (A) of FIG. 16 is a diagram schematically showing a state in which a reflection unit swings. (B) of FIG. 16 is a graph showing a change in swing angle of the reflection unit over time, in which the vertical axis represents a swing angle and the horizontal axis represents a time. (C) of FIG. 16 is a graph showing a signal (detection signal) detected by a sensor unit, in which the vertical axis represents a strength of a detection signal and the horizontal axis represents a time.

FIG. 4 shows a case in which the blocking unit laterally symmetrically swings. FIG. 16 shows detection of a detection signal when the blocking unit laterally asymmetrically swings.

(A) of FIG. 16 is a diagram schematically showing a state in which the reflection unit swings. (B) of FIG. 16 is a graph showing a change in swing angle of the reflection unit over time that swings as in (A) of FIG. 16, in which the vertical axis represents a swing angle and the horizontal axis represents a time. (C) of FIG. 16 is a graph showing a signal (detection signal) detected by the sensor unit, in which the vertical axis represents a strength of a detection signal and the horizontal axis represents a time.

As shown in (A) of FIG. 16, the blocking unit 4 is not symmetrical with respect to a surface including a normal line of the reflection unit 3, and an edge inside the blocking unit 4 is at a position with an initial mounting angle of 0°, and an edge outside the blocking unit 4 is at a position with an initial mounting angle of 20°. Thus, an angular difference between the edge of the blocking unit 4 in the resting state of the reflection unit and the detector is 20°.

The reflection unit 3 and the blocking unit 4 mounted thereon swing as shown in (A) of FIG. 16, and a graph showing a change in swing angle over time is a sine wave as shown in (B) of FIG. 16. A vertical width (90°) of the sine wave in (B) of FIG. 16 indicates a magnitude of a deflection angle of the reflection unit. As will be described below, a magnitude of the deflection angle of the reflection unit can be calculated by measuring a detection signal.

As shown in (A) of FIG. 16, immediately after swinging of the blocking unit 4 in the + direction starts, blocking of the sensor unit 6 is released and a state in which blocking is released until the swing angle returns to 0° again continues. Therefore, as shown in (C) of FIG. 16, a detection signal is detected for a t time.

Then, as shown in (A) of FIG. 16, when swinging of the blocking unit 4 in the − direction starts, the sensor unit 6 is blocked by the blocking unit 4, and a state in which blocking is performed until the swing angle becomes −20° continues. Thus, the swing angle becomes larger on the − side from −20° and a state in which blocking is released continues until it returns to −20° again. Therefore, as shown in (C) of FIG. 16, a detection signal is detected for a d time.

The swing period can be measured as an interval (T) of a corresponding detection signal.

It is possible to calculate a deflection angle and a deflection angle center deviation using t, d and T that can be measured from the detection signal and θ$_2$ and θ$_d$ that can be measured from the shape and the mounting angle of the blocking unit according to the following calculation formula. θ$_2$ denotes an angular difference between two edges of the blocking unit and θ$_d$ denotes an initial mounting angle of an edge inside the blocking plate (blocking unit).

$$\text{deflection angle} = \frac{4\theta_2}{\cos\left(\frac{\pi t}{T}\right) + \cos\left(\frac{\pi d}{T}\right)}, \quad \text{formula 1}$$

$$\text{deflection angle center deviation} = \frac{2\theta_2 \cos\left(\frac{\pi d}{T}\right)}{\cos\left(\frac{\pi t}{T}\right) + \cos\left(\frac{\pi d}{T}\right)} - \theta_d, \quad \text{formula 2}$$

(in the formula, T denotes a swing period of the reflection unit, θ$_2$ denotes an angular difference between two edges of the blocking unit, t denotes a time width of a pulse detected when the blocking unit swings in the + direction, d denotes a time width of a pulse detected when the blocking unit swings in the − direction, and θ$_d$ denotes an initial mounting angle of an edge inside the blocking plate (blocking unit))

In the formula, when a burden on a control unit is large due to calculation of a trigonometric function and the like, it is possible to suitably use an approximate formula.

In the angle detection method of the embodiments of the invention, when a gear-shaped blocking plate having a plurality of arcs equidistant with respect to a point on the rotation axis of the reflection unit is used as the blocking unit, the reflection unit is periodically swung about the rotation axis, the detection target is detected by the sensor unit as a pulse including an off state in which the detection target incident on the detection unit is blocked by the blocking unit and no detection target is detected by the detection unit and an on state in which blocking is released and thus the detection target is detected by the detection unit, and it is possible to detect a swing angle of the reflection unit based on the pulse width.

More specifically, when a gear-shaped blocking unit having a plurality of arcs equidistant with respect to the center of the rotation axis is used as the blocking unit, and the reflection unit is periodically swung about the rotation axis, it is possible to obtain the detection signal as shown in FIG. 12. Here, even if widths of teeth of the gear are exactly the same, since widths of pulses corresponding to the teeth of the gear differ according to angles at which the teeth of the gear are positioned, it is possible to determine a teeth of the gear to which a pulse corresponds according to the width of the pulse, and it is possible to detect a swing angle of the reflection unit 3.

The optical scanning device and the angle detection method of the embodiments of the invention can be beneficially used in the electronics industry in which a device configured to scan light and determine a distance to a target object, a shape thereof, and the like, a device configured to scan light and form an image, and the like are produced.

What is claimed is:
1. An optical scanning device comprising:
   a reflector, which is swingable;
   a blocking plate that is provided in the reflector to move in linkage with the reflector, wherein the blocking plate includes at least a first blocking plate disposed on a lower side of the reflector and a second blocking plate disposed on an upper side of the reflector; and
   a sensor unit that includes an output unit, which is a light generator or an electromagnetic wave generator configured to output a detection target and a detection unit, which is a light receiver or an electromagnetic wave receiver configured to detect the detection target, wherein the output unit is at a position that faces the detection unit, and wherein, when the reflector is in a predetermined swing angle range, the blocking plate blocks a path of the detection target between the output unit and the detection unit.

2. The optical scanning device according to claim 1, comprising:
a shaft part that is provided on both sides of the reflector; and
a support part that rotatably supports the shaft part,
wherein, the reflector swings by rotation of the shaft part.

3. The optical scanning device according to claim 2, wherein at least a part of the blocking plate has an arc equidistant from the shaft part.

4. The optical scanning device according to claim 3, wherein the blocking plate has a gear shape.

5. The optical scanning device according to claim 4, wherein widths of teeth of the gear shape of the blocking plate differ according to angles at which the teeth are positioned.

6. The optical scanning device according to claim 2, wherein the blocking plate is a flat plate and is disposed substantially parallel to an axial direction of the shaft part that swings the reflector.

7. The optical scanning device according to claim 1, wherein the blocking plate includes at least a first blocking plate and a second blocking plate, and
wherein, when the reflector is at a first position, the first blocking plate is positioned between the output unit and the detection unit of the sensor unit, and when the reflector is at a second position, the second blocking plate is positioned between the output unit and the detection unit of the sensor unit.

8. The optical scanning device according to claim 1, wherein the sensor unit includes at least a first sensor unit and a second sensor unit along a swing trajectory of the blocking plate, and
wherein, when the reflector is at a first position, the blocking plate is positioned between the output unit and the detection unit of the first sensor unit, and when the reflector is at a second position, the blocking plate is positioned between the output unit and the detection unit of the second sensor unit.

9. The optical scanning device according to claim 1, comprising:
a light source configured to generate scanning light,
wherein the reflector has a reflection surface that includes a first reflection area in which scanning light from the light source is received and reflected toward a first area and a second reflection area in which scanning light that is reflected and returned from the first area is received and reflected toward a second area, and
wherein the blocking plate is disposed between the first reflection area and the second reflection area.

10. The optical scanning device according to claim 1, wherein the blocking plate is integrally formed with the reflector or mounted on the reflector.

11. The optical scanning device according to claim 10, wherein, when the blocking plate is integrally formed with the reflector, the blocking plate is formed by providing a U-shaped notch in the reflector and bending the reflector.

12. The optical scanning device according to claim 2, comprising:
a detection angle adjustment mechanism which includes a rotation mechanism that rotates about the shaft part and moves the sensor unit and an actuator configured to control the rotation mechanism.

13. The optical scanning device according to claim 1, comprising:
a connection part that connects the reflector and the blocking plate.

14. The optical scanning device according to claim 1, comprising:
a control unit configured to determine a deflection angle and a deflection angle center deviation of the reflector based on a swing period for the reflector, a shape of the blocking plate, and detection information of the blocking plate that the sensor detects.

15. The optical scanning device according to claim 14, wherein the detection information includes a time width of a pulse detected when the blocking plate is swung and a frequency of the pulse.

16. The optical scanning device according to claim 15, wherein, when the blocking plate swings laterally symmetrically, the control unit calculates a maximum deflection angle of the reflector based on a following formula, maximum deflection angle of the reflector=$2\theta/\cos(2\pi f(t/2))$, here, $\theta$ denotes an angular difference between an edge of the blocking plate and the sensor unit, f denotes a frequency of swinging, and t denotes a time width of a pulse detected when the blocking plate is swung.

17. The optical scanning device according to claim 14, wherein, when the blocking plate swings laterally asymmetrically, the control unit determines the deflection angle and the deflection angle center deviation based on following formulas, $$\text{deflection angle} = \frac{4\theta_2}{\cos\left(\frac{\pi t}{T}\right) + \cos\left(\frac{\pi d}{T}\right)},$$

$$\text{deflection angle center deviation} = \frac{2\theta_2 \cos\left(\frac{\pi d}{T}\right)}{\cos\left(\frac{\pi t}{T}\right) + \cos\left(\frac{\pi d}{T}\right)} - \theta_d,$$

wherein T denotes a swing period of the reflector, $\theta_2$ denotes an angular difference between two edges of the blocking plate, t denotes a time width of a pulse detected when the blocking plate swings in a positive direction, d denotes a time width of a pulse detected when the blocking plate swings in a negative direction, and $\theta_d$ denotes an initial mounting angle of an edge inside the blocking plate.

18. The optical scanning device according to claim 1, wherein the sensor unit is disposed movably along a swing trajectory of the blocking plate.

19. The optical scanning device according to claim 1, wherein the detection target is light,
wherein the output unit is a light generator configured to emit the light; and
wherein the detection unit is a light receiver configured to detect the light emitted from the light generator.

20. A method of detecting an angle comprising:
swinging a blocking plate, which moves in linkage with a reflector that swings, wherein the blocking plate includes at least a first blocking plate disposed on a lower side of the reflector and a second blocking plate disposed on an upper side of the reflector; and detecting that the blocking plate has reached a predetermined swing angle using a sensor unit and detecting a swing angle of the reflector, wherein the sensor unit detects the swing angle by detecting whether a path of a detection target between an output unit, which is a light generator or an electromagnetic wave generator configured to output the detection target and a detection unit, which is a light receiver or an electromagnetic wave receiver configured to detect the detection target is blocked by the blocking plate, wherein the output unit is at a position that faces the detection unit.

* * * * *